Patented Feb. 22, 1949

2,462,433

UNITED STATES PATENT OFFICE 2,462,433

PREPARATION OF ORGANIC THIOCYANATES AND ISOTHIOCYANATES

Norman E. Searle, Wilmington, Del., assignor to E. I. du Pont de Nemours & Company, Wilmington, Del., a corporation of Delaware No Drawing. Application May 15, 1946, Serial No. 670,027

16 Claims. (Cl. 260—454)

This invention relates to organic thiocyanates and organic isothiocyanates and more particularly to a new process for their preparation.

The known methods for preparing organic thiocyanates involving the reaction of alkali metal or ammonium thiocyanates with organic halides possess various disadvantages. For example, sodium thiocyanate is extremely deliquescent and sufficient moisture is absorbed in handling this salt to make it sticky and in some cases even liquid. Therefore, special care must be employed in handling deliquescent sodium thiocyanate during its isolation and purification. Sodium thiocyanate is thus unsuitable for use in the manufacture of organic thiocyanates where anhydrous materials are needed to obtain good yields. Ammonium thiocyanate as produced commercially is a by-product in the manufacture of illuminating gas and contains a considerable amount of impurities. This makes it less desirable for use in the manufacture of organic thiocyanates of high quality.

It is an object of this invention to provide a new process for preparing organic thiocyanates and organic isothiocyanates. A further object is to provide a process for preparing organic thiocyanates and organic isothiocyanates from sodium cyanide which avoids the handling of deliquescent materials. A still further object is to provide an economical process for producing organic thiocyanates and organic isothiocyanates of high quality and in high yields from low-cost materials. Another object is to provide an improved process for the preparation of organic thiocyanates and organic isothiocyanates on a commercial scale. Other objects will appear hereinafter.

These objects are accomplished by the following invention of a new process for the preparation of organic thiocyanates and organic isothiocyanates which comprises reacting together a reactive organic halide, selected from the class consisting of organic chlorides, bromides and iodides, an alkali metal cyanide, and sulfur in the presence of an oxygenated organic solvent selected from the group composed of the lower aliphatic alcohols and ketones.

The term "reactive" as applied to organic halides herein and in the claims means any organic halide having a relative reactivity, as described in pages 1053–1055 and in Table XI in Gilman's "Organic Chemistry" volume I, second edition (1943), of at least 0.5 in comparison with that of n-butyl chloride as 1.0.

The "lower aliphatic alcohols and ketones" as used herein means aliphatic alcohols having 1 to 5 carbon atoms and aliphatic ketones having 3 to 7 carbon atoms.

The invention is carried out by reacting together the organic halide, the alkali metal cyanide, preferably sodium cyanide, and an excess of sulfur over that required by the cyanide, in the presence of a lower aliphatic alcohol or ketone, for example, methanol, ethanol or acetone. The over-all reaction is usually quite exothermic and the temperature of the reaction mixture is preferably maintained between 40° and 130° C., the particular temperature selected being dependent on the reactivity of the organic halide employed. The reaction mixture can be maintained at the desired temperature by controlling the rate of addition of the reactants, by allowing the mixture to reflux, by means of external cooling, or by various combinations of these methods. After the initial heat, considered to arise from the reaction of the alkali metal cyanide and sulfur, subsides the reaction mixture is heated externally, preferably between 40° and 130° C., the exact temperature depending on the particular halide and particular reaction medium employed, to insure complete reaction of the organic halide.

The resulting organic thiocyanate is isolated by diluting the reaction mixture with water, separating the organic layer with an organic solvent, such as methylene chloride or ether, washing the organic phase with water to remove soluble salts, and distilling. In special cases, depending on the temperature at which the distillation is conducted and the type of organic radical, the thiocyanate rearranges to the corresponding organic isothiocyanate during the distillation and is isolated as such.

The proportions of the ingredients used in the process of this invention can be varied to a considerable extent. However, for best results it is preferred that an appreciable excess, for example 10% excess, of alkali metal cyanide and a somewhat larger excess, for example 15 to 20% excess, of sulfur over the amounts theoretically required to react with the organic halide be employed. The excess of sulfur over that stoichiometrically required by the cyanide precludes formation of organic cyanides and surprisingly, not only does not hinder the formation of the organic thiocyanates, but promotes the formation of higher yields of the desired thiocyanate uncontaminated with undesirable impurities. A larger excess of sulfur can be used if desired but it is not necessary.

The specific reaction conditions employed in carrying out the process of this invention depend on the particular organic halide and alkali metal cyanide being reacted and the particular oxygenated organic solvent being used as the reaction medium. The reaction of the alkali metal cyanide, e. g. sodium cyanide, with sulfur in the presence of lower aliphatic alcohols and ketones takes place rapidly with evolution of heat. This initial phase of the reaction is conveniently controlled by regulating the rate of addition of one of these ingredients and by the use of external cooling. It is preferred to regulate the reaction temperature of this stage to within the range of 40° to 75° C.

In the second stage, the reaction between the sodium thiocyanate-containing mixtures and the organic halide takes place at either ordinary or elevated temperatures, the reaction proceeding more rapidly at higher temperatures and with the more active organic halides, such as allyl chloride and methallyl chloride. In order to obtain a good rate of reaction between the sodium thiocyanate and the organic halide, the reaction mixture is conveniently heated by external means and allowed to reflux. By the proper selection of the organic solvent employed as the reaction medium, reflux temperatures ranging from 50° to 130° C. are obtained. With the more active halides, both stages of the reaction proceed simultaneously, the halide reacting preferentially with the sodium thiocyanate as fast as it is formed (see Example II).

As illustrated by the following examples, the process of this invention includes various ways of adding the ingredients. Thus the alkali metal cyanide can be added to the mixture of sulfur, organic halide, and oxygenated organic solvent or sulfur can be added to a mixture of the other ingredients. A preferred method is to react the sulfur and sodium cyanide in the oxygenated organic solvent and then to add the organic halide directly to the crude reaction mixture containing the sodium thiocyanate formed as an intermediate in the oxygenated organic solvent but not isolated therefrom. This latter embodiment is particularly well suited for use on a commercial scale of operation, since it permits easy control of operating conditions. Alternately, the reaction may be conveniently controlled on a large scale by the addition of sulfur to a mixture of all the other reactants in the presence of a lower oxygenated solvent of the ketone and alcohol class.

In the following examples, the proportions of the ingredients are expressed in parts by weight, unless otherwise specified.

*Example I*

To a mixture of 362 parts (4.0 moles) of methallyl chloride (redistilled), 154 parts (4.8 atoms) of sulfur, and 317 parts of methanol in a reaction vessel fitted with a reflux condenser, a mechanical stirrer and means for cooling the reaction mixture externally, there is added 227 parts (4.4 moles) of 95% sodium cyanide (analytical grade) at such a rate that, with external cooling, the temperature of the mixture is maintained at 40° C. When the reaction subsides, about 1 hour from the start of the addition of the ingredients, the mixture is heated, with stirring, at 53–67° C. for another hour. The reaction mixture is then cooled, diluted with water, extracted with ether, and the ether extract washed with water until free of thiocyanate ions as indicated by the ferric chloride test. After drying over anhydrous sodium sulfate, the ether solution is distilled through an efficient fractionating column. There is obtained 303 parts of methallyl isothiocyanate, a colorless oil boiling at 104.5–105° C./111 mm. This isothiocyanate is the rearrangement product of methallyl thiocyanate formed in the reaction.

Ten parts of the above product added to 45 parts of 28% ammonium hydroxide and heated at the boiling temperature on a steam bath for 10 minutes, yields, after treatment with decolorizing carbon, 8.4 parts (73% of the theoretical) of white crystals of methallylthiourea, melting at 91.8–92.5° C.

*Example II*

To a slurry of 227 parts (4.4 moles) of 95% sodium cyanide (analytical grade), 362 parts (4.0 moles) of redistilled methallyl chloride, and 396 parts of acetone in a reaction vessel of the type used in Example I, is added portion-wise and with stirring 154 parts (4.8 atoms) of sulfur at such a rate that the mixture is maintained at a rapid reflux by the heat evolved, about ½ hour being required. When the reaction begins to subside, heat is applied to maintain refluxing for another ½ hour, the original reflux temperature of about 40° C. having gradually risen to about 75° C. at the end of this period. The reaction mixture is then cooled, diluted with water, extracted with ether, and the ether extract washed with water until free of thiocyanate ions as shown by the ferric chloride test. After drying over anhydrous sodium sulfate, the ether solution is distilled through an efficient fractionating column. There is obtained a yield of 389.5 parts (86% of the theoretical) of methallyl isothiocyanate, a colorless oil distilling at 97° C./76 mm.; $n_D^{21}$ 1.5237. This isothiocyanate is the rearrangement product formed on distillation of the methallyl thiocyanate produced in the reaction of sulfur, sodium cyanide and methallyl chloride.

*Example III*

To a mixture of 258 parts (5.0 moles) of 95% sodium cyanide and 523 parts of absolute ethyl alcohol in a reaction vessel of the type used in the preceding examples, there is added slowly, with efficient stirring, 176 parts (5.5 atoms) of sulfur, about 20 minutes being required. Sufficient cooling is provided during the addition to maintain the temperature of the mixture at 40° to 45° C. After the addition is completed, 421 parts (5.5 moles) of allyl chloride is added and the mixture is heated at reflux temperature for 1¼ hours. The reaction mixture is cooled, the precipitated sodium chloride filtered off and the filtrate distilled under reduced pressure through an efficient fractionating column. There is obtained 414 parts (84% of the theoretical) of allyl isothiocyanate distilling at 84–85° C./80 mm. This isothiocyanate is the rearrangement product of the allyl thiocyanate formed in the reaction.

*Example IV*

A slurry of 35.7 parts (0.692 mole) of 95% sodium cyanide (analytical grade) and 79.2 parts of methanol in a reaction vessel of the type used in the preceding examples is stirred while 23.2 parts (0.725 atom) of sulfur is added at such a rate that with external cooling, the temperature of the mixture is maintained at 40° to 45° C., about 20 minutes being required. After the reaction subsides, the condenser is arranged for distillation, 122.8 parts (0.6 mole) of dodecyl chloride and 184 parts of n-butyl alcohol are added, and the mixture is heated to distill out the methanol. As the methanol is removed, the temperature of the mixture increases, and when a temperature of 127° C. is attained the condenser is readjusted to reflux. After refluxing for six hours, the reaction mixture is cooled, diluted with ether, and washed with water. This ether solution is then dried over anhydrous sodium sulfate and decolorizing carbon, and distilled under reduced pressure. A yield of 102 parts (75% of the theoretical) of dodecyl thiocyanate, a colorless oil boiling at 143–5° C./2 mm., is obtained.

The length of time required to complete the reaction varies with the reactivity of the organic halide employed and with the reaction temperature being used. Thus, as illustrated by Example II, when methallyl chloride is employed as the organic halide, sodium cyanide is used as the alkali metal cyanide and acetone is employed as the oxygenated organic solvent, only one hour at 40° C. to 75° C. is necessary for the entire reaction, as the methallyl chloride reacts preferentially with the sodium thiocyanate as fast as it is formed from the sodium cyanide and sulfur. The extra half hour of refluxing is carried out to ensure complete reaction. However, when less reactive organic halides, for example dodecyl chloride, and higher boiling alcohols, such as normal butyl alcohol, are employed, substantially complete reaction is obtained when the mixture is refluxed at a temperature of about 125° to 130° C. for six hours.

Although the process of this invention has been illustrated with particular reference to the preparation of allyl and methallyl isothiocyanates (through the rearrangement of the corresponding thiocyanates) and dodecyl thiocyanate under certain reaction conditions, the invention is generally applicable to the preparation of organic thiocyanates and allylic type organic isothiocyanates from organic halides having reactive halogen atoms.

A preferred class of organic halides which is particularly useful in the process of this invention is a primary halide having the halogen atom attached to a carbon atom which is in turn attached to other atoms by single bonds only. Specific examples of this type include: ethyl iodide, n-propyl bromide, n-butyl chloride, n-amyl iodide, dodecyl chloride, allyl chloride, allyl bromide, methallyl chloride, propargyl bromide, benzyl chloride, 1,4-dichloro-2-butene, p-di(chloromethyl)benzene, hexamethylene dibromide, ethyl chloroacetate, isobornyl chloroacetate, β-(butoxyethoxy)ethyl chloride, β-phenoxyethyl chloride, dodecyl chloroacetate, chloroacetone, and the like.

While organic halides having the halogen attached to a carbon atom which is in turn attached to other atoms by more than one bond, e. g., vinyl chloride and chlorobenzene, have very low reactivity, this reactivity can be enhanced by the presence of certain groups having a labilizing effect on the halogen. As illustrative of this type of organic halide which can be used in this invention, the following examples are given: 2,4-dinitrochlorobenzene, 2-chloro-pyridine, 4-bromo-pyridine, and the like.

It is to be understood that the term "halides" is employed herein in a generic sense to include chlorides, bromides, and iodides, but to exclude fluorides. The chlorides are preferred for economic reasons; however, the bromides are more versatile, and the iodides are still more reactive. Hence, the bromides and iodides are used when the chlorides react too slowly.

The examples have illustrated the use of three particular oxygenated organic solvents as the reaction media. However, other aliphatic alcohols having less than six carbon atoms and other aliphatic ketones having less than eight carbon atoms can be used for this purpose. Specific examples of such alcohols include methyl, ethyl, n- and isopropyl, n-, iso-, sec.-, and tert.-butyl, and the amyl alcohols. Examples of such aliphatic ketones suitable for use in the process of this invention include methyl ethyl ketone, acetone, diethyl ketone and diisopropyl ketone. These particular oxygenated organic solvents have an unexpected catalytic activity as reaction media. They have little or no solvent power on the sodium cyanide or the sulfur, yet they cause the reaction to proceed rapidly. They are used in proportions of less than four parts by weight per one part of alkali metal cyanide. Preferably about one to two parts of oxygenated organic solvent are employed for each part of cyanide. In general, any alkali metal cyanide can be used in the process of this invention. However, for economic reasons, sodium cyanide is preferred.

The process of this invention is of considerable value for the manufacture of organic thiocyanates and their rearrangement products, the isothiocyanates, on a large scale, since this invention utilizes low-cost raw materials, that is sodium cyanide and sulfur, and since it is not necessary to isolate the intermediate sodium thiocyanate prior to its reaction with the desired organic halide. The resulting organic thiocyanates, or corresponding isothiocyanates, are produced in high yields and in extreme purity. These organic thiocyanates and their corresponding organic isothiocyanates are of great commercial importance as pesticides, insecticides, and as basic intermediates in the synthesis of other pesticides and in the synthesis of various types of organic compounds.

As many apparently widely different embodiments of this invention may be made without departing from the spirit and scope thereof, it is to be understood that I do not limit myself to the specific embodiments thereof except as defined in the appended claims.

I claim:

1. A process of preparing organic thiocyanates and isothiocyanates which comprises reacting together an organic halide having a relative reactivity of at least 0.5 in comparison with n-butyl chloride as 1.0 and selected from the class consisting of organic chlorides, bromides and iodides, an alkali metal cyanide, and an excess of sulfur over that stoichiometrically required by said alkali metal cyanide in an oxygenated organic solvent selected from the class consisting of the lower aliphatic alcohols having from 1 to 5 carbon atoms and aliphatic ketones having from 3 to 7 carbon atoms, and isolating therefrom a member of the class consisting of organic thiocyanates and isothiocyanates.

2. A process of preparing organic thiocyanates and isothiocyanates which comprises reacting together an organic halide having a relative reactivity of at least 0.5 in comparison with n-butyl chloride as 1.0 and selected from the class consisting of organic chlorides, bromides and iodides, sodium cyanide, and an excess of sulfur over that stoichiometrically required by said sodium cyanide in the presence of methanol, and isolating therefrom a member of the class 3. A process of preparing organic thiocyanates and isothiocyanates which comprises reacting together an organic halide having a relative reactivity of at least 0.5 in comparison with n-butyl chloride as 1.0 and selected from the class consisting of organic chlorides, bromides and iodides, sodium cyanide, and an excess of sulfur over than stoichiometrically required by said sodium cyanide in the presence of ethanol, and isolating therefrom a member of the class consisting of organic thiocyanates and isothiocyanates.

4. A process of preparing organic thiocyanates and isothiocyanates which comprises reacting together an organic halide having a relative reactivity of at least 0.5 in comparison with n-butyl chloride as 1.0 and selected from the class consisting of organic chlorides, bromides and iodides, sodium cyanide, and an excess of sulfur over that stoichiometrically required by said sodium cyanide in the presence of acetone, and isolating therefrom a member of the class consisting of organic thiocyanates and isothiocyanates.

5. A process of preparing organic isothiocyanates which comprises reacting together an organic chloride having a relative reactivity of at least 0.5 in comparison with n-butyl chloride as 1.0, sodium cyanide, and an excess of sulfur over that stoichiometrically required by said sodium cyanide in an oxygenated organic solvent selected from the class consisting of the lower aliphatic alcohols having from 1 to 5 carbon atoms and aliphatic ketones having from 3 to 7 carbon atoms, and isolating therefrom an organic isothiocyanate.

6. A process of preparing organic thiocyanates and isothiocyanates which comprises adding an organic halide having a relative reactivity of at least 0.5 in comparison with n-butyl chloride as 1.0 and selected from the class consisting of organic chlorides, bromides, and iodides to a reaction mixture of an alkali metal cyanide and an excess of sulfur over that stoichiometrically required by said alkali metal cyanide in an oxygenated organic solvent selected from the class consisting of the lower aliphatic alcohols having from 1 to 5 carbon atoms and aliphatic ketones having from 3 to 7 carbon atoms, and isolating therefrom a member of the class consisting of organic thiocyanates and isothiocyanates.

7. A process of preparing organic thiocyanates and isothiocyanates which comprises adding an excess of sulfur to a mixture of an alkali metal cyanide and an organic halide having a relative reactivity of at least 0.5 in comparison with n-butyl chloride as 1.0 and selected from the class consisting of organic chlorides, bromides and iodides in an oxygenated organic solvent selected from the class consisting of the lower aliphatic alcohols having from 1 to 5 carbon atoms and aliphatic ketones having from 3 to 7 carbon atoms, said sulfur being added in excess over that stoichiometrically required by said alkali metal cyanide, and isolating therefrom a member of the class consisting of organic thiocyanates and isothiocyanates.

8. A process of preparing organic thiocyanates and isothiocyanates which comprises adding an alkali metal cyanide to a mixture of an excess of sulfur over that stoichiometrically required by said alkali metal cyanide and an organic halide having a relative reactivity of at least 0.5 in comparison with n-butyl chloride as 1.0 and selected from the class consisting of organic chlorides, bromides and iodides in an oxygenated organic solvent selected from the class consisting of the lower aliphatic alcohols having from 1 to 5 carbon atoms and aliphatic ketones having from 3 to 7 carbon atoms, and isolating therefrom a member of the class consisting of organic thiocyanates and isothiocyanates.

9. A process of preparing organic thiocyanates and isothiocyanates which comprises reacting together an organic halide having a relative reactivity of at least 0.5 in comparison with n-butyl chloride as 1.0 and selected from the class consisting of organic chlorides, bromides and iodides, sodium cyanide, and an excess of sulfur over that stoichiometrically required by said sodium cyanide in an oxygenated organic solvent selected from the class consisting of the lower aliphatic alcohols having from 1 to 5 carbon atoms and aliphatic ketones having from 3 to 7 carbon atoms, and isolating therefrom a member of the class consisting of organic thiocyanates and isothiocyanates.

10. A process of preparing methallyl isothiocyanate which comprises reacting together methallyl chloride, sodium cyanide, and an excess of sulfur over that stoichiometrically required by said sodium cyanide in an oxygenated organic solvent selected from the class consisting of the lower aliphatic alcohols having from 1 to 5 carbon atoms and aliphatic ketones having from 3 to 7 carbon atoms, and isolating therefrom methallyl isothiocyanate.

11. A process of preparing dodecyl thiocyanate which comprises reacting together dodecyl chloride, sodium cyanide, and an excess of sulfur over that stoichiometrically required by said sodium cyanide in an oxygenated organic solvent selected from the class consisting of the lower aliphatic alcohols having from 1 to 5 carbon atoms and aliphatic ketones having from 3 to 7 carbon atoms, and isolating therefrom dodecyl thiocyanate.

12. A process of preparing organic thiocyanates and isothiocyanates which comprises reacting together a primary organic halide having the halogen atom attached to a carbon atom which is in turn attached to other atoms by single bonds only and selected from the class consisting of organic chlorides, bromides and iodides, an alkali metal cyanide and an excess of sulfur over that stoichiometrically required by said alkali metal cyanide, in an oxygenated organic solvent selected from the class consisting of the lower aliphatic alcohols having from 1 to 5 carbon atoms and aliphatic ketones having from 3 to 7 carbon atoms, and isolating therefrom a member of the class consisting of organic thiocyanates and isothiocyanates.

13. A process of preparing organic thiocyanates and isothiocyanates which comprises reacting together a primary organic halide having the halogen atom attached to a carbon atom which is in turn attached to other atoms by single bonds only and selected from the class consisting of organic chlorides, bromides and iodides, sodium cyanide and an excess of sulfur over that stoichiometrically required by said sodium cyanide, in an oxygenated organic solvent selected from the class consisting of the lower aliphatic alcohols having from 1 to 5 carbon atoms and aliphatic ketones having from 3 to 7 carbon atoms, and isolating therefrom a member of the class consisting of organic thiocyanates and isothiocyanates.

14. A process of preparing organic thiocyanates and isothiocyanates which comprises adding an excess of sulfur to a mixture of an alkali metal cyanide and a primary organic halide having the halogen atom attached to a carbon atom which is in turn attached to other atoms by single bonds only and selected from the class consisting of organic chlorides, bromides and iodides in an oxygenated organic solvent selected from the class consisting of the lower aliphatic alcohols having from 1 to 5 carbon atoms and aliphatic ketones having from 3 to 7 carbon atoms, said sulfur being added in excess over that stoichiometrically required by said alkali metal cyanide, and isolating therefrom a member of the class consisting of organic thiocyanates and isothiocyanates.

15. A process of preparing organic thiocyanates and isothiocyanates which comprises adding an excess of sulfur to a mixture of sodium cyanide and a primary organic halide having the halogen atom attached to a carbon atom which is in turn attached to other atoms by single bonds only and selected from the class consisting of organic chlorides, bromides and iodides in an oxygenated organic solvent selected from the class consisting of the lower aliphatic alcohols having from 1 to 5 carbon atoms and aliphatic ketones having from 3 to 7 carbon atoms, said sulfur being added in excess of that stoichiometrically required by said sodium cyanide and isolating therefrom a member of the class consisting of organic thiocyanates and isothiocyanates.

16. A process of preparing organic thiocyanates and isothiocyanates which comprises adding an excess of sulfur to a mixture of sodium cyanide and a primary organic halide having the halogen atom attached to a carbon atom which is in turn attached to other atoms by single bonds only and selected from the class consisting of organic chlorides, bromides and iodides in ethanol, said sulfur being added in excess over that stoichiometrically required by said sodium cyanide and isolating therefrom a member of the class consisting of organic thiocyanates and isothiocyanates.

NORMAN E. SEARLE.

REFERENCES CITED

The following references are of record in the file of this patent:

UNITED STATES PATENTS

| Number | Name | Date |
| --- | --- | --- |
| 1,963,100 | Salzberg | June 19, 1934 |
| 2,077,478 | Hollander et al. | Apr. 20, 1937 |
| 2,281,677 | Craig et al. | May 5, 1942 |
| 2,331,276 | Piki | Oct. 5, 1943 |

OTHER REFERENCES

Williams, "Chemistry of Cyanogen Compounds" (1915), page 188.

Mellor, "Modern Inorganic Chemistry" (1917), page 768.